(12) United States Patent
Wenger et al.

(10) Patent No.: US 10,409,877 B2
(45) Date of Patent: Sep. 10, 2019

(54) SEARCH ENGINE RESULTS DECLUMPING METHOD

(71) Applicant: Quality Logo Products, Inc., Aurora, IL (US)

(72) Inventors: Michael Wenger, Naperville, IL (US); Bret Bonnet, North Aurora, IL (US)

(73) Assignee: QUALITY LOGO PRODUCTS, INC., Aurora, IL (US)

( * ) Notice: Subject to any disclaimer, the term of this patent is extended or adjusted under 35 U.S.C. 154(b) by 561 days.

(21) Appl. No.: 15/208,746

(22) Filed: Jul. 13, 2016

(65) Prior Publication Data

US 2017/0116341 A1 Apr. 27, 2017

Related U.S. Application Data

(60) Provisional application No. 62/244,273, filed on Oct. 21, 2015.

(51) Int. Cl.
| | |
|---|---|
| *G06F 7/00* | (2006.01) |
| *G06F 17/30* | (2006.01) |
| *G06F 16/9535* | (2019.01) |
| *G06Q 30/06* | (2012.01) |
| *G06F 16/248* | (2019.01) |
| *G06F 16/28* | (2019.01) |
| *G06F 16/2457* | (2019.01) |

(52) U.S. Cl.
CPC ........ *G06F 16/9535* (2019.01); *G06F 16/248* (2019.01); *G06F 16/24578* (2019.01); *G06F 16/287* (2019.01); *G06Q 30/0643* (2013.01)

(58) Field of Classification Search
CPC ......... G06F 17/30867; G06F 17/30601; G06F 17/3053; G06F 17/30554; G06Q 30/0643
USPC .......................................................... 707/723
See application file for complete search history.

(56) References Cited

U.S. PATENT DOCUMENTS

| | | | |
|---|---|---|---|
| 7,966,089 B1* | 6/2011 | Krishnaswamy .. | G05B 19/4183 700/101 |
| 2003/0182176 A1* | 9/2003 | Monnerjahn .......... | G06Q 10/04 705/7.29 |
| 2007/0132727 A1* | 6/2007 | Garbow .............. | G06F 16/2428 345/157 |
| 2007/0160052 A1* | 7/2007 | Okada ................... | H04L 45/742 370/392 |
| 2008/0005118 A1* | 1/2008 | Shakib .................. | G06F 16/951 |
| 2008/0140566 A1* | 6/2008 | Chowins ................ | G06Q 20/10 705/39 |

(Continued)

*Primary Examiner* — Binh V Ho
(74) *Attorney, Agent, or Firm* — Dennemeyer & Associates, LLC

(57) ABSTRACT

The present disclosure includes both systems and methods for introducing variety into search results of non-stock consumer goods. This variety is introduced by recording the common characteristics of non-stock consumer goods in a database and tracking the number of goods with a common characteristic that would be displayed on a webpage. If too many of one type of good would be displayed on a webpage, alternative goods are displayed in place of the additional goods with common characteristics, even if these goods are more relevant to the search performed by a user. In this way, consumers can efficiently be presented with both relevant and alternative non-stock consumer goods, saving consumers' time and using less computing power.

17 Claims, 21 Drawing Sheets

(56) References Cited

U.S. PATENT DOCUMENTS

| | | | | |
|---|---|---|---|---|
| 2008/0243830 A1* | 10/2008 | Abhyanker | ............ | G06F 16/338 |
| 2009/0094138 A1* | 4/2009 | Sweitzer | ................ | G06Q 30/06 |
| | | | | 705/26.1 |
| 2011/0055091 A1* | 3/2011 | Budlong | ................ | G06Q 10/00 |
| | | | | 705/313 |
| 2011/0202883 A1* | 8/2011 | Oh | ........................ | G06F 3/0481 |
| | | | | 715/846 |
| 2013/0218940 A1* | 8/2013 | Shannon | ................ | H04L 65/40 |
| | | | | 709/201 |
| 2013/0290321 A1* | 10/2013 | Shapira | ............... | G06F 16/9535 |
| | | | | 707/723 |
| 2014/0129333 A1* | 5/2014 | Nakamura | ......... | G06Q 30/0256 |
| | | | | 705/14.54 |
| 2015/0134648 A1* | 5/2015 | Deshpande | ......... | G06F 21/6209 |
| | | | | 707/723 |
| 2015/0348157 A1* | 12/2015 | Garcia | ............... | G06Q 30/0625 |
| | | | | 705/26.62 |

* cited by examiner

| | |
|---|---|
| Simple Data Fields: 210<br><br>Title<br>Product ID<br>Primary Image<br>Hex Color | Complex Data Fields: 220<br><br>Item Size<br>Product Colors<br>Product Pricing<br>Product Delivery<br>Product Decoration / Imprint Area<br>Pen Types and Ink Colors (Pens)<br>Memory Size (Flash Drives)<br>Beverage Type (Koozies)<br>Oz. Capacity<br>Materials<br>Related Searches<br>Transit Time |

FIG. 2

Item Size Examples: 221

Five Inches High X Four Inches Wide (Five * Four) = Twenty
Six Inches High X Three Inches Wide X Three Inches Deep (Six * Three * Three) = Fifty Four Six Inches High X Three Inches Wide X Two One Hundredths of an Inch Deep (Six * Three) = Eighteen (Depth is not used because it's too small in relation to the width and height)

Sixty Inches High X Thirty Inches Wide X Four and Six Tenths Inches Deep (Six * Three * (Four and Six Tenths Inches * Six Tenths)) = Forty Nine and Sixty Four One Hundredths (Only Sixty Percent (Six Tenths) of depth is used because this dimension is between Twenty Percent and Fifteen Percent of the next smallest dimension. width. at Thirty Inches)

FIG. 3

Product Delivery Example:

A five day production ordered on December Twenty Second

222

| Sun | Mon | Tue | Wed | Thu | Fri | Sat |
|---|---|---|---|---|---|---|
| 21 | 22 Order day | 23 Day 1 | 24 Christmas Eve / Skipped | 25 Christmas Day / Skipped | 26 Day 2 | 27 Skipped |
| 28 Skipped | 29 Day 3 | 30 Day 4 | 31 New Year's Eve / Skipped | Jan 1 New Year's Day / Skipped | 2 Day 5 Shipped | 3 Skipped |
| 4 Skipped | 5 Arrival date via overnight | 6 | 7 | 8 | 9 | 10 |
| 11 | 12 | 13 | 14 | 15 | 16 | 17 |

FIG. 4

Product Decoration / Imprint Area Example:                                           223

If a product has 2 possible decorations: a round ink imprint and a square laser engrave area, it would generate values in these fields:

"decoration_ink"
"decoration_round"
"decoration_ink_round"
"decoration_laser"
"decoration_square"
"decoration_laser_square"

The various details for each decoration type including imprint dimensions, setup cost (at default quantity), setup cost JSON (for calculating the setup and specific quantity), total imprint area (Width*Height for purposes of sorting), Ratio of imprint area to product size (for purposes of sorting) are stored in fields named according to their decoration and shape combinations. These fields would be:

"decoration_ink_size"
"decoration_round_size"
"decoration_ink_round_size"
"decoration_laser_setup"
"decoration_square_setup"
"decoration_laser_square_setup"

Input Cleaning Examples:                                         420

For "foldable chairs" the word "foldable" would be replaced with "folding" (the more commonly used form of the word), and the analyzed search would become "folding chair".

For "bule stress reliver" the word "bule" (found to be a common typo for "blue") would be replaced by "blue", and "reliver" (often misspelled this way) would be replaced by "reliever", and the analyzed search becomes "blue stress reliever".

"Custom ball product" would strip out "custom" as all promotional products are customized, and "product" as it is overly redundant because all items are products. The search would just be "ball".

FIG. 7

Declumping Rules Example: 311

1. Create a counter for each product type, to keep a running count of products of this same type.
2. Create a counter for this product vendor, to keep a running count of products of this same vendor.
3. If the product count exceeds the limit for a page skip it and begin processing the next product.
4. If the vendor count exceeds the limit for a page (as defined for that specific vendor) skip it and begin processing the next product.
5. If the product type counter for this row of products shows there is already a product of this type on this row skip it and begin processing the next product.
6. If the product has not been skipped, set it at the next position in the database.
7. Increment the counters for products on the page by type, vendor and type per row.
8. Increment the value of the category position to be filled.
9. Remove newly positioned product from the list being processed.
10. If the category position to be filled is at the start of a new row clear the product types per row counter, and begin processing the remaining products from the beginning of the list instead of where the process last left off, to allow for previously skipped products to be considered for the new row.
11. If the category position to be filled is at the start of a new page clear the product types counter as well as the vendor counter, and begin processing the remaining products from the beginning of the list instead of where the process last left off, to allow for previously skipped products to be considered for the new row.
12. If it has been determined that every single product has been considered for a position, and skipped over due to not meeting the criteria for the limits of a type or vendor, then the remaining positions are filled by the remaining products ignoring the limits.

FIG. 8C

| | |
|---|---|
| Category name: A list of the categories this product belongs to.<br>Industry name: A list of the industries this product belongs to.<br>Event name: A list of the events or themes this product belongs to.<br>Holiday name: A list of the holidays this product belongs to.<br>Cause name: A list of the causes this product belongs to.<br>Special category name: This indicates any special categories a product may belong to. These are pre-filtered categories like "Free Rush", "On Sale", etc.<br>Color family: A list of the available color options for the product.<br>Closeout colors: A list of the available color options for the products that are currently on closeout.<br>Brand: The Brand name for a product.<br>Made in USA: A true/false values to indicate if a product is made in the USA.<br>Material: The name of the material a product is made of.<br>Decoration: List of imprint options available for a product.<br>Decoration area: The shape of the decoration area, one of: Circle, Oval, Square, Tall (Rectangle), Wide (Rectangle)<br>Beverage type: The type of beverage that product can support.<br>Memory capacity: If the product is a memory stick, this is the capacity of that drive.<br>Oz capacity: Liquid oz. capacity. | Is new: Indicates a product as being recently added to the site.<br>On sale: Indicates if a product is currently on sale.<br>On closeout: Indicates if a product is currently on closeout.<br>Free setup: Indicates if a product has free setup.<br>Free shipping: Indicates if a product has free shipping available.<br>Ecofriendly: Indicates if a product is verified eco-friendly.<br>Is QCA: Indicates if a product is quality certified.<br>QLP best seller: Indicates if a product is a best seller.<br>Has 360: Indicates if a product has a 360 product view.<br>Free rush promo: Indicates if a product has free rush service.<br>Has video: Indicates if a product has a video.<br>Ink color: A list of ink colors available for a pen.<br>Pen type: A list of tips or ink types available for a pen.<br><br><br>321 |

FIG. 10A

BROWSE BY: ▷

CAUSES ▷

❯ Item Price[1] ▽

LOW $ — HIGH $ — QTY.
☐ — ☐ — ☐

☐ Show Setup[†]
☐ Show Shipping[†]

( GO )

❯ Item Color ▽

☐ ☐ Blue (305)
☐ ☐ Black
☐ ☐ White (220)
☐ ☐ Red (199)
☐ ☐ Green (179)
☐ ☐ Gray (178)
☐ ☐ Orange (91)
☐ ☐ Tan (79)
See More Colors ❯ Delivery[1] ▽

WHEN DO YOU NEED IT?

[ mm/dd/yy ] 📅

ZIP CODE [ 60606 ]

( GO )

❯ Product Type ▷ — 320

❯ Brand ▷

❯ Material ▷

❯ Decoration[1] ▷ — 320

❯ Item Size[1] ▷

550 — ❯ Imprint Area[1] ▷

❯ Other Options ▷ — 320

[1] Patent Pending

| BROWSE BY: | PRODUCT ▽ | INDUSTRY △ | HOLIDAYS △ | CAUSES △ |
|---|---|---|---|---|

GO!

Browse by PRODUCT

| | | |
|---|---|---|
| Awards | Flashlights | Pens |
| Backpacks | Frisbees | Pet Products |
| Bags | Golf Accessories | Plastic Bags |
| Bottle Openers | Golf Balls | Portfolios |
| Business Supplies | Hand Sanitizers | Rulers |
| Calculators | Hats, Caps & Visors | Stadium Cups |
| Calendars | Highlighters | Stickers |
| Candy | Jackets & Outerwear | Sticky Note Pads |
| Ceramic Mugs | Keychains / Keytags | Stress Balls |
| Clocks | Koozie Can Coolers | Sunglasses |
| Coasters | Lanyards | Sweatshirts |
| Computer Accessories | Letter Openers | T-Shirt |
| Coolers | Luggage Tags | Tape Measures |
| Corporate Apparel | Lunch Bags | Tote Bags |
| Day Planners | Magnets | Towels |
| Desktop Accessories | Mouse Pads | Trade Show Giveaways |
| Drinkware & Barware | Notebooks & Journals | Travel Mugs |

SEARCH ENGINE RESULTS DECLUMPING METHOD

CROSS-REFERENCE TO RELATED APPLICATIONS

This application incorporates by reference and claims the benefit of priority to U.S. Provisional Patent Application No. 62/244,273 filed Oct. 21, 2015.

BACKGROUND OF THE INVENTION

The present invention relates generally to a search engine results declumping method used in ecommerce. Particularly, the present invention relates to both systems and methods for introducing variety into the results a search engine provides based off indexed data on available non-stock (customizable) products on an ecommerce site.

Traditional ecommerce sites allow for a user to search the site's non-stock product catalog based off keyword searches and typically return products which have been indexed as matching one or more of the keywords in the user's search. This traditional style of searching likely displays several relevant results to the user, but does not account for more in depth data which can be indexed and factored into a search for products. Information such as item's physical characteristics, similar alternatives, production schedules, and potential shipping methods are all very important real world business concerns which are not accounted for in a traditional ecommerce search.

To illustrate this point, if a user was to search on a traditional ecommerce site they would start with entering a keyword search for the product they sought (e.g., a stress ball). The search engine would then examine the indexed data for products in its database, looking for products indexed as relating to the terms searched (e.g., "stress" and "ball"). The results then displayed by the search engine would amount to every product in the ecommerce site's inventory related to the search term. For larger ecommerce sites, this poses an issue because the number of related products could be in the thousands.

To tackle this issue, most sites have begun using different optimization techniques to display the most relevant results first in this list of products displayed. This optimization is typically done off the strongest match to the search terms (e.g., products that are indexed under both "stress" and "ball"). This method, however, does not account for practical business concerns such as which products can be produced and shipped the fastest nor, if there are multiple versions of a product available, which of these versions is the most relevant to the user. Another downfall of this traditional searching method is that only one type of product (e.g., stress balls) is likely to be displayed to a prospective customer without the seller having a chance to present other related products (e.g., beach balls or novelty shaped stress relievers) that may interest the consumer more.

Accordingly, there is a need for systems and methods capable of introducing variety into the results a search engine provides based off indexed data of available non-stock products on an ecommerce site.

BRIEF SUMMARY OF THE INVENTION

The subject matter provided herein addresses these issues by providing systems and methods which introduces variety into search results using a combination of traditional keyword indexing and the indexing of non-traditional information regarding various practical business factors.

The systems and methods for introducing variety may be integrated into a larger system with parts of the system described distinctly in this disclosure for ease that in reality work in unison. The first part of this larger search engine system is functionality for indexing product data. An index is created storing multiple fields per record for either the purpose of display or calculating if this record should be returned in specific searches. This data includes simple product data such as the title, id, and primary image of products, as well as calculated values such as liquid ounce capacity, and size of product (taking into account all available dimensions of a product). The calculated data is more complex than just simple text or numeric values, and this data is converted to a simple alphanumeric value using a series of proprietary conversions. This complex data may include: item size, product colors, product pricing, product delivery, product decoration/imprint area, pen types and ink colors (for pens), memory size (for flash drives), beverage type (for koozies), capacity, materials, related searches, and transit time. All of these complex data entries are pre-calculated and stored in the index.

The next part of the search engine system may be the systems and methods for introducing variety into the search results. This functionality acts to pre-sort and process categories/lists of products to introduce variety in search results by breaking up long runs of one type of product. Some searches may result in too many of one type of product at the top of the results page while leaving other types of products buried giving the false impression that the seller only has one type of product to offer. To overcome this issue and introduce more variety in these situations the list of products returned by a search may be reviewed with a set of rules which only allow a certain number of the same products per line and per page.

Another part of the search engine system may be functionality for optimizing a user's search query. This may be accomplished in a few different ways. First, a search suggestion function runs a simple version of a full search as each value is typed into the search box by a user. The system may then display search suggestions which show the top three records determined to be most relevant to the user's input. Second, before any search query is sent to the search engine, the input may be cleaned and analyzed. The cleaning and analysis may entail first removing any special characters, leaving only letters, numbers, spaces and punctuation. The search input may then be run through a specially configured search index analyzer where it is compared word by word against a dictionary of synonyms (in British and American English), replacing obscure or less common terms with a single more common term. Past search history related to the searched term(s) may also be reviewed, looking for any common typos which can be corrected.

Once a user inputs a search, another part of the system may function to display and filter the results in an optimized way. The filters displayed by the system on the results page may be tied to and optimized by the product searched for. Each product has various attributes, features, options, or specifications (e.g., colors a product may come in, available decoration methods, memory capacity of USB sticks, or the beverage capacity of water bottles.) All of these characteristics can be used as "facets" which may be defined as, but is not limited to mean, a common characteristic found in multiple product listings used for filtering the products as having related characteristics. On the search results page 550, the system may display the most prevalent facets found among the relevant items identified by the search as selectable filters to aid the user in filtering their search in the most efficient manner possible.

An object of the present invention is to provide a solution to the issue of there being no way for consumer to search non-stock ecommerce products for both relevant and varied results.

An advantage of this invention is that it assists a consumer, shopping on an ecommerce website, with optimizing and filtering search results. When utilizing this invention, a consumer may easily search for multiple non-stock products which can fulfill their needs; rather these needs be dictated by time, price, size, or any other product characteristic.

Another advantage of this invention is that the results provided are varied on purpose to provide the consumer with some potential alternative non-stock products in addition to the product they searched for. This is beneficial because it assists the consumer in brainstorming solutions to their need for customized items. Normally, when a user searches for "shirt" on a non-stock ecommerce website, the top results found by the search engine would all be shirts. This is useful for finding shirts, but leaves out the possibility that shirt shaped drink holders or luggage tags might also be attractive solutions to the consumer, who would be unaware of such items existence when using a traditional search engine.

Yet another advantage of the present invention is that it improves user interfaces for information retrieval by reordering search results to provide product results with increased product type novelty, vendor novelty, [etc.]. By providing increased search result sorting novelty, the system may aid users in more quickly finding product search results as well as require less system memory to conduct such searches.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2 is a table of simple and complex data fields used by the search engine system.

FIG. 3 is a table of equations that demonstrate how item size is converted from a complex piece of data to simple numeric value.

FIG. 4 is a diagram which demonstrates how the data field product delivery is formulated.

FIG. 5 is a table of data fields that may be populated when information about product decoration and imprint area are recorded in the index.

FIG. 6A is a system screen checking a user's spelling.

FIG. 6B is a system screen suggesting search queries.

FIG. 7 is a table of examples demonstrating how a user's input may be cleaned by the system.

FIG. 8C is a table of example rules for varying search results.

FIG. 10A is a table listing filter facets.

FIG. 10B is a system screen displaying filters.

FIG. 11B is a system screen displaying a price filter.

FIG. 11C is a system screen displaying a decoration filter.

FIG. 12A is a system screen displaying product categories which may be searched.

FIG. 12B is a system screen displaying product categories search result page.

DETAILED DESCRIPTION OF THE INVENTION

Figure 1:
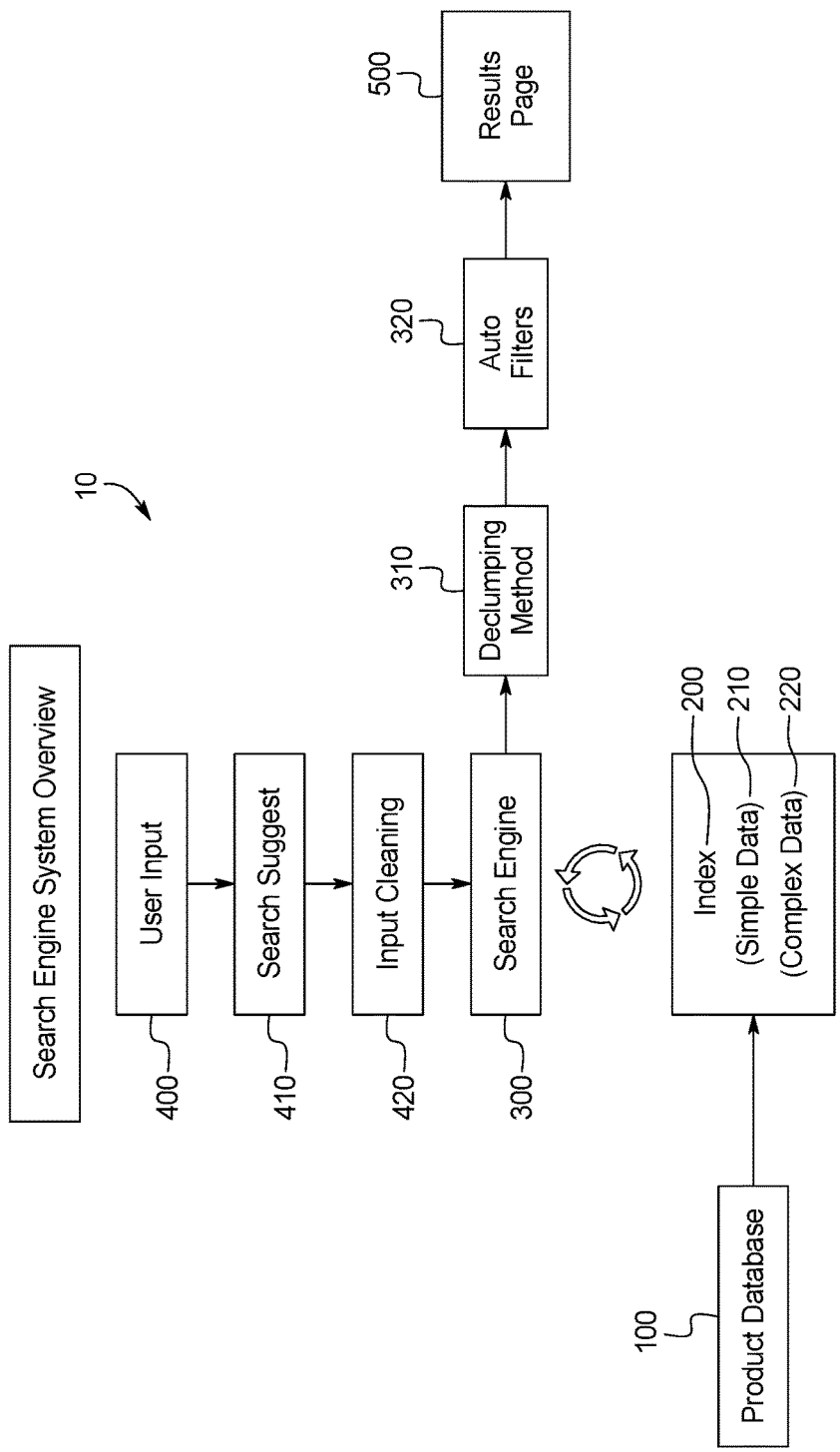
FIG. 1 is a diagram of the search engine system.

FIG. 1 is a diagram of the search engine system 10. As shown in FIG. 1, the system 10 may consist of various different functionalities which allow it to efficiently search a non-stock product database 100. These functionalities include an index 200 which efficiently stores certain data, both simple data 210 and complex data 220, about the products 30 found in the database 100, to allow for quicker searching by the search engine 300, in response to a user input 400. Also shown in FIG. 1, the system 10 refines a user's input 400 through suggesting search terms 410 and cleaning 420 the user's input 400 of extraneous information. Additionally, FIG. 1 shows that the system 10, displays the search results 500 to the user after analyzing the results to ensure there is a proper variety in the results using a declumping method 310 and that the appropriate data filters 320 are displayed. The system 10 may utilize any or all of the above functionalities when performing a search and may also utilize other functional components as needed to search the product index 200 and/or product database 100 based off not only keyword searches, but also searches by product category 610, applications of a product, or any other type of product listing display refinement. The searching, ranking, and varying of result records 501 may be done in real time or be pre-populated to save system 10 resources. For instance, if an embodiment of the system 10 performs the declumping method 310 for products 30 listed by product category 610, the system 10 may generate a varied set of results 500 ahead of time (e.g., early in the morning when system 10 usage is at a low), so when a user selects to search by "T-shirts" or any other product category 610, the system 10 may quickly display the pre-populated artificially varied results 500.

FIG. 2 is a table of data fields that may be stored in the product index 200. As shown in FIG. 2 both simple data 210 and complex data 220 may be accommodated by the index 200. Simple data 210 is basic alphanumeric information which may be placed into the index 200 without any conversion needed. Complex data 220 is also stored in the index 200 as alphanumeric data, but must first be converted via certain formulas, mathematical and otherwise, to the same alphanumeric format as the simple data 210. The data fields listed in FIG. 2 are a non-exhaustive list of examples demonstrating how simple 210 and complex 220 pieces of data may be accommodated by the system 10.

FIG. 3 is a list of examples demonstrating how item size 221 may be converted from a complex piece of data 220 to simple numeric value 210. As shown in FIG. 3, each product 30 may have any number of the following defined: Width, Height, Length, Depth, and Diameter. If there are three dimensions with values in them (height, width, and depth or height, width, and diameter), the two larger dimensions are multiplied together, to create a base number. The third dimension may, or may not, be used if its value is high enough to be considered a factor in the overall size of the product 30. If the third dimension is twenty percent or more of the second largest dimension then the size may be calculated as that base multiplied by the final dimension. If the smallest dimension is between 20% and 15% of the next smallest dimension then the base is multiplied by only 60% of the smallest dimension. If the smallest dimension is between 15% and 10% of the next smallest dimension then the base is multiplied by only 20% of the smallest dimension. If the smallest dimension is less than 10% of the next smallest dimension then that dimension is not counted, and the value stays as the original product 30 of the two biggest dimensions. If one of the dimensions is diameter then the relative size is calculated by half the diameter squared multiplied by Pi (getting the area of a circle) and the larger of the height or width. If only two dimensions have values, and they are width and height, then the relative size is the product 30 of those two values. If only diameter has a value then the item size is calculated at by half the diameter squared multiplied by Pi. Once a single number is formulated, it is stored as item size 221 denoting the relative size of a product 30 and used as an option for sorting, allowing very differently shaped items to be comparably sorted.

FIG. 4 is a diagram of how the complex data field 220 product delivery date 222 may be formulated into simple data 210. As show in FIG. 4, holidays and weekends are not counted by the search engine system 10 when calculating the product delivery date 222. In the example show, a product 30 ordered on December 22nd would take 14 calendar days to actually be delivered if the buyer opted for a 5 business day delivery window. This functionality, calculating the actual number of days it takes for product 30 delivery, is run each day on every single product 30 for all of their respective delivery windows and stored in the product index 200 under product delivery 222 as a simple alphanumeric piece of data which allows filtering by estimated delivery date. The actual number of days for delivery may be indexed by the system 10 based on data collected for postal service options from all the vendor factories to every US zip code stored by the system 10, preventing the need for the system 10 to communicate with postal service websites each time a user performs a search.

FIG. 5 is a list of the data fields that may be populated when product decoration/imprint area 223 is recorded in the index 200. As show in FIG. 5, each product 30 may have one or more options by which it can be decorated. Each option includes a location on the product 30, the size and shape of the imprint, the method of the imprint, and any charges associated with setting up that imprint for the product 30. For every option available, there are a few traits quantified and stored in the index 200 by generating values in fields designated for product decoration/imprint area 223. This allows for searching for products 30 by the search engine system 10 not only the individual product decoration/imprint area 223 options, but also by combinations of them.

Other data fields may also be populated by the system 10 in the index 200. For each product 30 there may be a list of product colors stored in the index 200. Along with this list, there may be another list of all product colors on closeout for the purpose of closeout only searches filtered by color. For each unique color, there is a thumbnail image specific to that color stored by the system 10 along with multiple field definitions each one named after a unique color. An example of this is if one product color field value is recorded as "blue", then there may also be a field called "imageThumb_blue" added to the index 200. The use of multiple fields to store information regarding each color is used primarily to display the given product 30 in a given color when requested. The thumbnail location, if available, will be stored in the corresponding thumbnail field for easy processing when search results are returned. There is also a large text field in the index 200 for holding all product color data, a data packet is created storing the various colors and shades of colors a product 30 comes in, as well as the image representation of each color, hex codes for displaying the color, as well as secondary/accent colors for the color options. Since indexes 200 may only store simple data 210 in the index, the data packet maybe serialized into JavaScript Object Notation (JSON). The serialized JSON text is then stored in the large text field, for deserialization into complex data 220 when the record is retrieved.

Each product 30 recorded in the index 200 may also be associated with several pricing data fields. These fields may include the low and high prices of an item with a default imprint as well as the low and high prices of the blank item. In the case of more advanced pricing searches performed by the system 10, there may also be an entire second index populated with pricing information for products 30. This second index includes fields for: the service level (the speed of production, which impacts the price); the quantity to which the pricing applies (unit price is often cheaper at higher quantities); the number of days it takes to produce the product 30 at this service level; and the number of colors in an imprint that can be used at the specified service level.

Other, more specialized data fields may be populated by the system 10 to aid users when searching for and filtering results. One example is the data fields specialized for information concerning pens. Many of the pens have options for ink color, pen type, and pen color. The options for pen types may include "ballpoint", "highlighter", "rollerball", "gel", "marker" and "fountain". Each of these types of pens can come in a variety of pen colors as well as a variety of ink colors. Additionally, certain pen colors may have limits on the ink colors they offer. The data for these options may be stored in the index 200 by the system 10 by first storing a list of pen types along with the list of ink colors available for each pen. A third field may contain a list of all the valid combinations of pen color, pen type, and ink color. This list of valid combinations is used to filter out records 501 who do not match all three criteria, as well as data for showing which combinations are available when creating the results.

Still yet other examples of specialized data fields potentially used by the system 10 exist. These may include a memory size field for the storage capacity of customizable flash drives, a beverage type field which details what types of beverages may be held by customizable koozies, and a material type field which details what material (e.g., plastic, metal, etc.) each product 30 is made of A product capacity field may record each product's 30 capacity, when relevant. The capacity stored may be recorded in ounces, with the system 10 converting any differing units of measurement (e.g., gallons, milliliters, etc.) for a given product 30 before storage in the index 200. The system 10 may also round product capacities to the nearest whole number(s), rounding both up and down if the capacity is a decimal number (e.g., a capacity of 16.2 ounces would be rounded down to 16 and up to 17) and saving both these whole numbers in the product capacity field. The storage of multiple capacities close to the actual capacity is useful because it allows users to search for products 30 that are a near match to their needs and also, from a practical stand point, prevents users from having to type decimal numbers into the search engine.

The system 10 may also store and index metadata collected over time leading to more efficient searching. This information may include related search metadata obtained by the system 10 tracking product 30 views and which keywords from other search sites (e.g., Google, Yahoo, or Bing) was the source of the page view. Each product keyword is then searched on the system's 10 search engine 300 to see how many products 30 are returned. The top five keywords searched returning the most products 30 from the search engine 300 are stored in the index 200 as relating to the product 30, in the order of most returned records 501 to least. This metadata is used primarily in the search suggest feature 410 to show suggested searches related to the products 30 being displayed by the system 10.

Figures 6A, 6B:
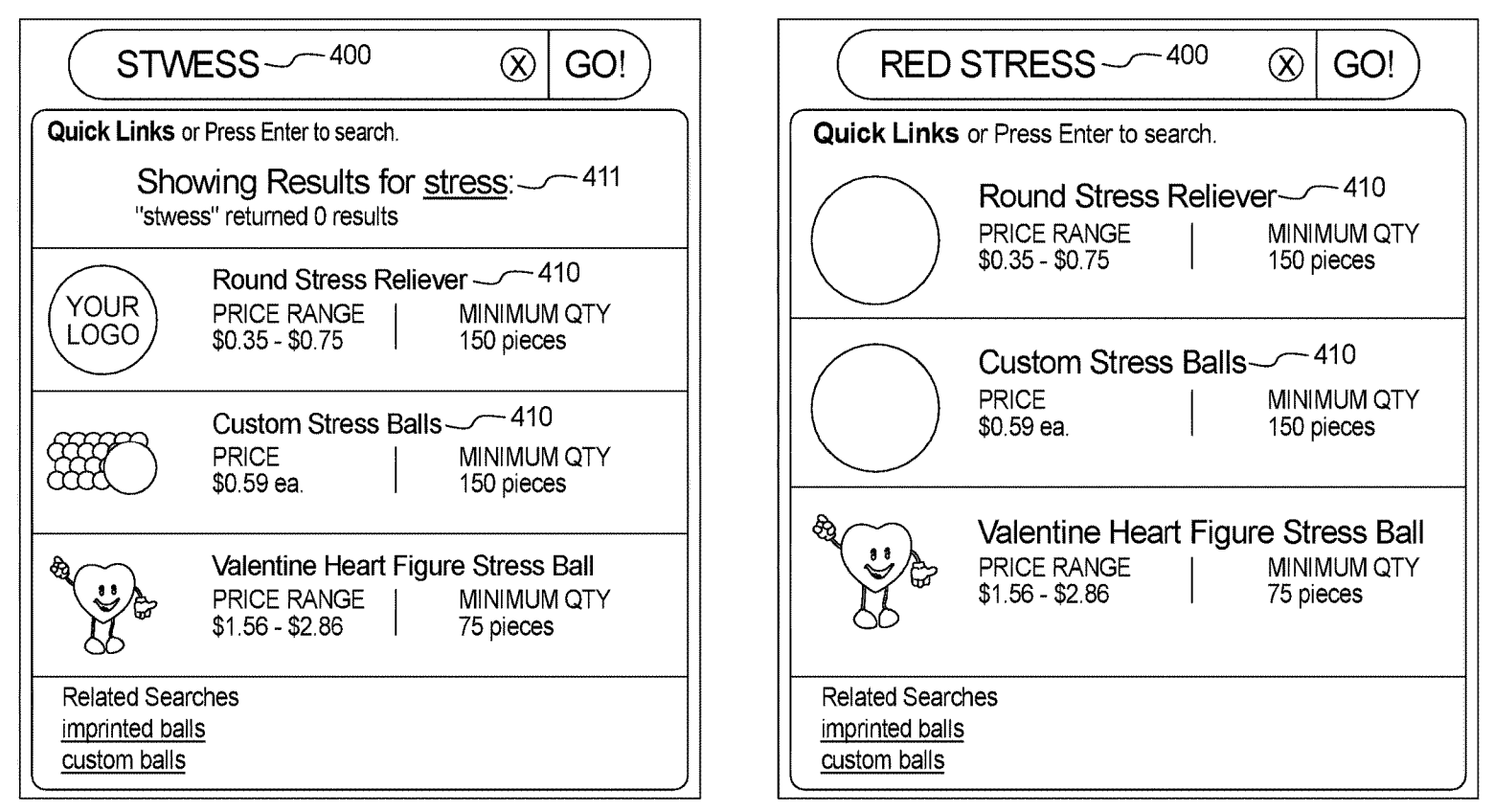

FIG. 6A is a perspective view of the system 10 suggesting search queries 410 by checking the user's spelling 411. As shown in FIG. 6A, the system 10 will analyze a user's input 400 and suggest alternative spellings 411.

FIG. 6B is a perceptive view of the system 10 suggesting search queries 410. As shown in FIG. 6B, the system 10 will analyze a user's input 400 and suggest 410 non-stock products 30 to search for. Rather than just showing a list of possible searches, the system 10 displays a small picture and details for products 30 that match the search in progress. These details may include the price range of a product 30 as stored in the index 200, as well as minimum order quantity. As a value is being typed into the search box, suggestions appear showing the top three records 501 having a title that match the search value, ordered by a determined relevance.

After three characters have been entered into the search box every new character entered triggers a process of analyzing the value, querying the search engine, and presenting suggested results. The entered value is also taken as a whole and run against a list of color option names, looking to see if it contains any color terms (e.g., black, blue, camo, etc.). The system 10 then breaks the search down into the matched color option (if any was found), and the search value minus that matched term (referred to as the "clean term"). A query to the index 200 is then built to search against the product 30 title either containing the "clean term" or beginning with the clean term. This term is also used to search against the titles any content pages stored in the index 200 as well. The query is built to give implied and explicit weight to matches. Due to the configuration of the search index, records who find the search term near the beginning of the field are given more weight than those found further into the text of a field. There is also an explicit weight passed that a product 30 match should take priority over a content match. A boost is added instructing the index 200 to give higher priority to products 30 which a higher view count (for the purpose of giving preference to more popular products). Once this query has been constructed if there was a matched color term it is added as a filter on the query.

Once the input has been checked for color, item number, and other factors; a query is built based on its finding and this query it is ready to be submitted to the search engine. The newly created search query and the original value for spellchecking are then all submitted to the search engine for results. The query sent to the search engine is set to run through the analyzer above and automatically search using the analyzed value.

Clicking on a suggested query 410 takes you directly to that product's 30 detail page, and if a color was found in the original search value that color and image is remembered and used as the default image when viewing the product 30. Below the suggested queries 410 are two "Related Search" suggestions. These are a list of searches previously used to find that product 30 in order of how many other products 30 that search has generated links to. The first two previous search terms that are returned with the results (assumed to be the search terms that would return the most products 30) are listed below the suggested queries 410. Clicking on either of the related searches links will redirect to the search bar using the clicked search as the search query 410.

FIG. 7 is a list of examples demonstrating how a user's input 400 may be cleaned 420 by the system. To clean 420 the input 400, the system first removes any special characters from the user's input 400, leaving only letters, numbers, and spaces. Then the search input 400 is run through a special configured search index analyzer where it is compared word by word against a dictionary of synonyms which replaces obscure or less common terms with more common ones. Refining the user's input 400 in this way prevents the system 10 from having to search for irrelevant information or perform the same search twice if two terms searched for have the same meaning.

Figure 8A:
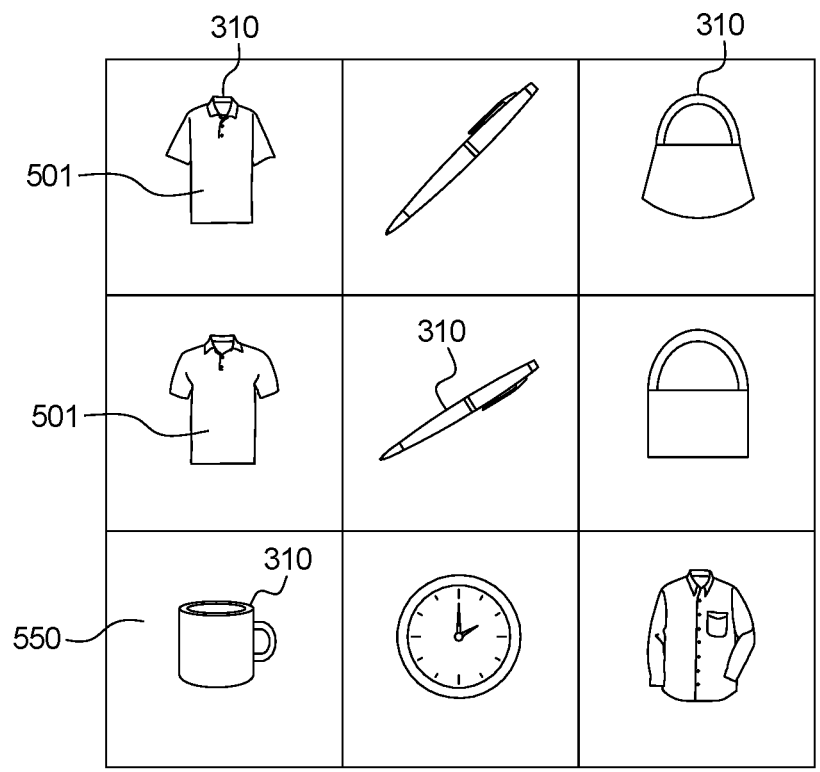
FIG. 8A is a diagram of how variety may be introduced into the system's search results.

FIG. 8A is a diagram of a declumping method 310 for introducing into system 10 search results 500. As shown in FIG. 8A, each individual search result 501 is placed on the search results page 550 in a grid. The records 501 selected to be displayed are not only displayed because of their relevance to the user's search input 400, but also analyzed using a set of rules 311 which, in this example, only allow a certain number of same product type 31 (e.g., cup, shirt, bag, cooler, etc.) per result line and per page. This introduction of variety in the search results is termed declumping. It is important to note the rules 311 which are applied by the declumping method may account for any number of factors in place of or in addition to those mentioned above, including: a limit on the number of items per column on a page and a limit on the number of items from the same vendor which may displayed on each line, column, or page.

Figure 8B:
FIG. 8B is a system screen providing varied search results.

FIG. 8B is a system 10 screen providing varied search results 500. As shown in FIG. 8B, the system displays search results 500 in response to a user's search input 400 for "shirt". The system 10 not only shows individual search results 501 for "shirt", but also utilizes a declumping method 310 to introduce variety by placing non-stock products 30 related to the search term "shirt", but not actually a shirt, on the search results page 550. The declumping method 310 also entails distributing these varied individual search results 501 throughout the results page 550 to help the user shop more efficiently.

FIG. 8C is a list of rules 311 which may be used by the declumping method 310 to introduce variety in the search results 500. As shown in FIG. 8C, the declumping method 310 may only allow a certain number of same products 30 per search results page 550, only one of a product type 31 per row on a search results page 550, and for vendors who sell very similar types of products 30, the number of products 30 that vendor may list on a search results page 550 is also limited. This list of rules 311 is in no way limiting and may account for any factors which may improve shopping efficiency. The product type 31 for each product 30 is a property which may be accounted for in a database field (or fields) of the system 10. Different sorts of properties may also be accounted for by the system 10, with the system 10 set to vary results based off these other properties instead of declumping based off the different types of products 30 recognized by the system (e.g., pens, pencils, clocks, wallets, etc.).

One example of a different property which may be used to vary search results could be product size. In some cases, a user may search by only one product type 30 (e.g., cups). Since in this situation, the system 10 has been restricted from displaying different types of products 30, it may still introduce variety into the results by using a different property stored by the system 10 for each product 30. If the property product size was used, the system would display to the user various sizes of the product searched for (e.g., different sized cups) which allows users to search more efficiently through non-stock items.

Figure 8E:
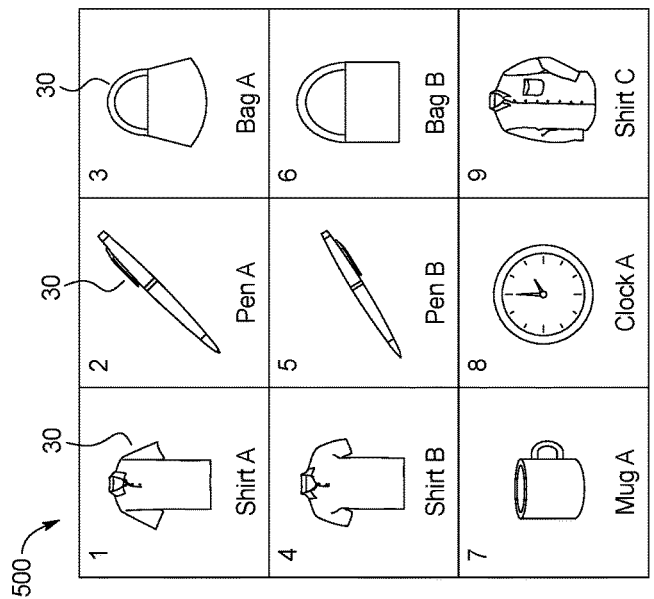
FIG. 8E illustrates an example system results screen.
Figure 8D:
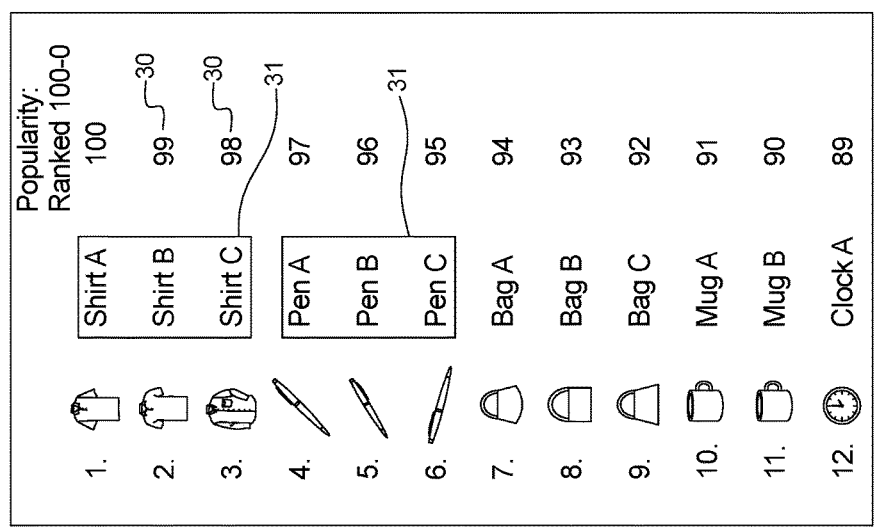
FIG. 8D illustrates the results of a search ordered by popularity

FIG. 8D illustrates search results 500 ordered by popularity. As shown in FIG. 8D, the popularity of an individual product 30 may be very similar to other products 30 of that type 31, causing products of a type 31 to visually "clump" in the results when placed into a ranked order. Such "clumping" can occur in any visual cluster (e.g., a row, column, or any combination of the two up to and including an entire web page). In this example, the product type 31 shirts constitute the top three results by popularity, with pens constituting the next three results followed by three bags. If these results were displayed to a user, the visual clusters first viewed by a user (e.g., first rows, columns, and results page) would consist of only shirts, pens, and bags. In real world examples, the clumping may be more extreme with entire pages worth of results dominated by a single product type 31. Similar issues may occur on a vendor basis causing "clumps" of products from a single vendor. Accordingly, the system may use a declumping method 310 to increase product variety in search results. The declumping method 310 may limit the number of products 30 of a particular type 31 or from a particular vendor on each line of search results and on each page of search results. To accomplish this, the declumping method 310 may use per line limits and per page limits for product types 31 and vendors. The rules 311 which govern these limits (previously discussed in FIG. 8A) may also be setup to prevent the same product type 31 or multiple products 30 from the same vendor from being displayed adjacent to one another on a results page 550.

The declumping method 310 may initialize a product type line counter, vendor line counter, product type page counter, and vendor page counter for each product type 31 and vendor in the search results. These counters may be referred to as property type counters, with multiple property type counters potentially accounting for each product 30 from a given product type 31 displayed by the system 10. When a counter reaches an associated limit, the system 10 may stop populating items matching that counter. For example, the declumping method 310 may utilize a product type 31 line limit, vendor line limit, product type 31 page limit, and a vendor page limit that specifies the limit for each counter. Limits may very per product type 31 and vendor type. For example, one vendor may have a higher vendor page limit than another vendor. The declumping method 310 may populate a results page from the search results list from the highest popularity products 30 down within the provided limits. Each time a result is added to the results page it is removed from the results list and the various counters are updated, as appropriate.

FIG. 8E illustrates an example system 10 search results page 550. As shown in FIG. 8E, the results of FIG. 8D are processed by the declumping method 310. The results page 550 shown in FIG. 8E includes slots for nine search results for products 30 with three rows of three results apiece.

Figure 8F:
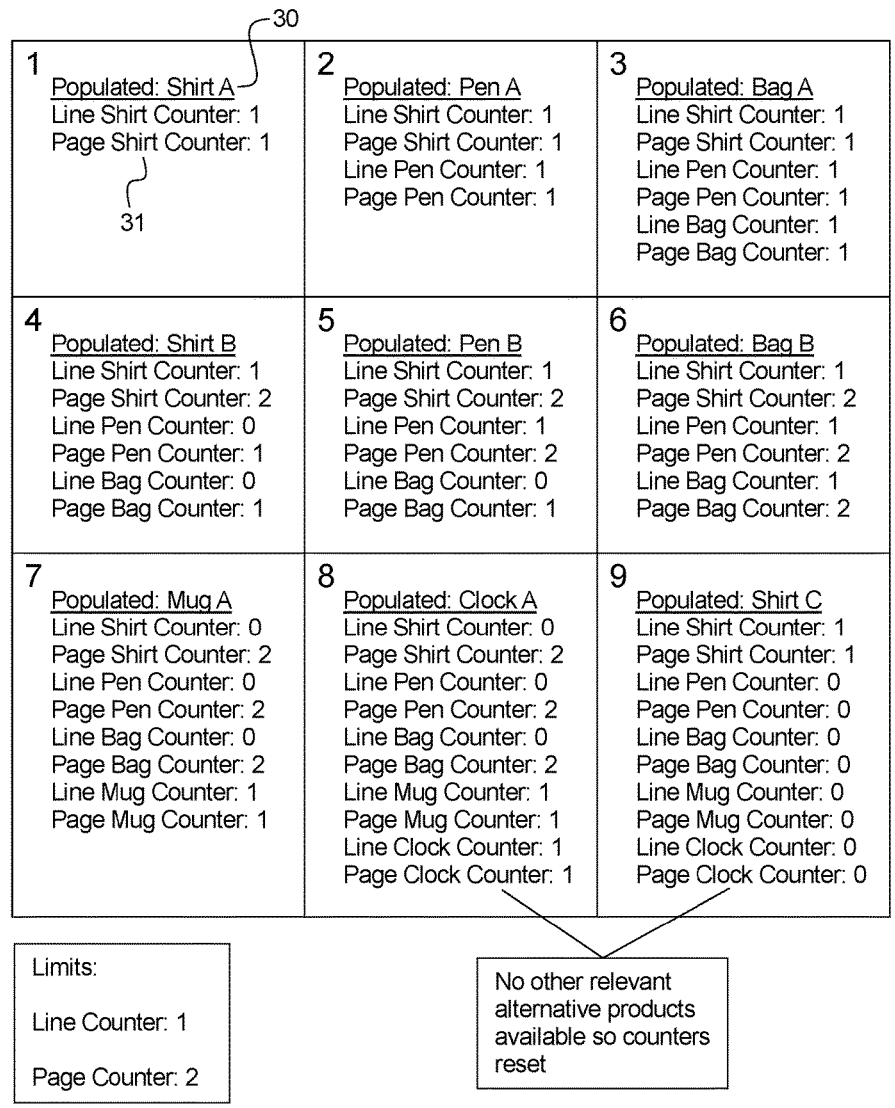
FIG. 8F illustrates the state of the declumping method during the population of the results screen.

FIG. 8F illustrates the state of the declumping method 310 during the population of the results screen. As shown in FIG. 8F, the results from FIG. 8D are analyzed and at an initialization step of this analysis, all counters are initialized at zero and the various line and page limits are initialized. As shown, a line counter limit may be one so that only one product 30 of a product type 31 is shown on each line of the search results. Also shown, a page counter limit is initialized to two limiting the number of products 30 of a product type 31 on a page to two.

At step one, the most popular product 30 result, Shirt A, is populated into slot one, and a shirt line counter and a shirt page counter are incremented. Next, at step two, because the shirt line counter is at the line counter limit, the declumping method skips Shirt B through Shirt C and populates Pen A in slot two. A pen line counter and a pen page counter are incremented. Then, at step three, because both the shirt line counter and the pen line counter are at the line counter limit, the declumping method skips Shirt B through Pen C and populates Bag A into slot three. A bag line counter and a bag page counter are incremented.

At step four, a new line is started and the line counters are cleared. Since no line counters are at the line counter limit and no page counters are at the page limit, the declumping method populates slot four with the most popular item remaining, Shirt B. The shirt line counter and the shirt page counter are both incremented. Next, at step five, the shirt line counter is at the line counter limit and the shirt page counter is at the page counter limit, thus Shirt C is skipped and Pen B is populated into slot five. The pen line counter and the pen page counter are both incremented. At step six, both the shirt line counter and the pen line counters are at the line counter limit, thus Shirt C through Pen C are skipped and Bag B is populated into slot six. The bag line counter and the bag page counter are both incremented.

At step seven, a new line is started and the line counters are cleared. Because the shirt page counter, the pen page counter, and the bag page counter are all at the page counter limit, Shirt C through Bag C are skipped and Mug A is populated in slot seven. A mug line counter and a mug page counter are incremented. At step eight, the shirt page counter, the pen counter, and the bag page counter are all at the page counter limit, and the mug line counter is at the line counter limit. Accordingly, Shirt C through Mug B are skipped, and Clock A is populated in slot eight. A clock line counter and a clock page counter are incremented.

At step nine, the shirt page counter, the pen counter, and the bag page counter are all at the page counter limit, and the mug line counter is at the line counter limit. The declumping method accordingly skips Shirt C through Mug B and arrives at the end of the results list. Having reached the end of the results list, the declumping method may then clear the counters, and then populate slot nine with Shirt C, the highest remaining item in the results list. The declumping method may then clear page counters and line counters and begin populating the next page of results in the same manner as described.

In some embodiments, upon reaching the end of the results list, the declumping method 310 may clear only some of the counters, for example, in an embodiment; the declumping method may clear only the line counters. Alternatively, in another embodiment, the declumping method may clear only the page counters. If the declumping method reaches the end of the list after clearing only some of the counters, additional counters may cleared until a qualifying item may be populated in the open slot.

In other embodiments, additional counters and limits may be provided to prevent other forms of clumping. For example, in an embodiment, the declumping method 310 may include line vendor limits and page vendor limits. Line vendor limits may limit the number of results from a single vendor per line in the same manner as shown above regarding products. Likewise, page vendor limits may limit the number of results from a single vendor per page.

Figure 8G:
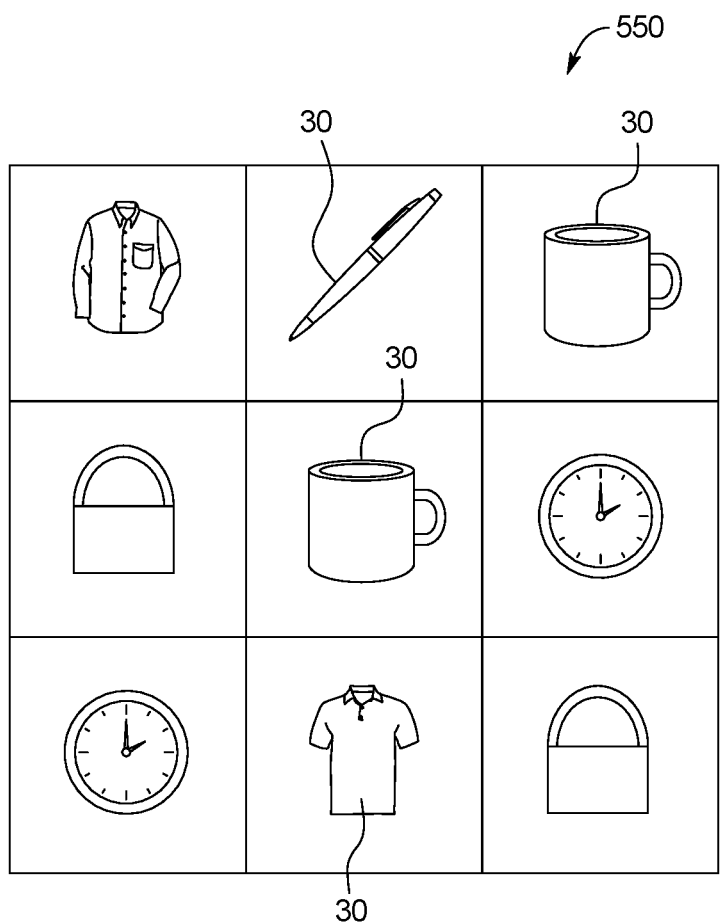
FIG. 8G is a diagram of a declumping method for introducing variety into system search results utilizing a row, column, and page counter.

FIG. 8G is a diagram of a declumping method 310 for introducing variety into system 10 search results 500 utilizing a row, column, and page counter. As shown in FIG. 8G, the declumping method may use additional and/or alternative rules 311 for declumping search results 500 (as compared to the embodiment of FIGS. 8A-8F). In this example, the results 500 displayed are sorted based off limits on the number of products 30 for a given product type 31 which may be displayed per row, column, and page of search results 500. The additional column counter functions in the same way as the row and page counters discussed in FIGS. 8A-8F, but instead tracks and limits the number of products 30 with an associated product type 31 (e.g., shirt, purse, clock, pen) per column on a search results page 550 to further prevent clumping of search results 500. Referring back to FIG. 8A, shirts, pens, and purses are all displayed to a user with two or more of the same product types in a given single column. The embodiment of FIG. 8G prevents such an issue, with the counters limiting the number of products from a given product type which may be displayed on a search results page at one per column, one per row, and two per page. This provides a more varied display of search results 500 to the user, which is particularly useful for non-stock items as consumers may find more use out of comparing a customizable pen versus a customizable shirt, purse, clock, etc. versus comparing two customizable types of pens.

Figure 9:
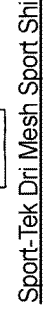
FIG. 9 is a system screen displaying search results.

FIG. 9 is a perspective view of the system 10 displaying search results 500. As shown in FIG. 9, the system 10 displays a search results page 550 in response to the user input 400 "shirt". The results page 550 shown includes individual records 501 for non-stock shirts and varied individual records 501 for items related to "shirt". Also shown in FIG. 9, the system 10 creates a set of filters 320 which correspond to facets (common characteristics) 321 found in the search results 500. In FIG. 9, the filter 320 for color has been applied, resulting in the system 10 displaying results 500 which are black in color. A user may filter the results 500 using the available filters 320 for other facets 321 such as pen ink color, product size, and the type of beverage applicable products 30 can hold.

FIG. 10A is a table listing potential filter facets 321. Shown in FIG. 10A is a non-exhaustive list of common characteristics found in search results 500. These common characteristics, or facets 321, are determined by the system 10 in response to each set of search results 500 and displayed on each results page 550 in combination with filters 320 which can sort the results 500 based on the facets 321. To determine what facets 321 and filters 320 should be used by the system 10 for a given set of search results 500, first the search query 400 is pattern checked to see if it looks like any form of a product ID. In this case it would be either just a number, or a number preceded by Q or QLP. If a product number (or pattern like a product number) is found, it is submitted against the database to find the requested product by its QLP item number. If a product 30 is found using that number, the visitor is redirected to the product detail page for that product 30. If no pattern was found, or no product 30 is found using the detected pattern, the analysis continues. An important note is that the potential filter facets 321 listed in FIG. 10A are a non-exhaustive list and any characteristics of any products 30 may be used by the system 10 to group and filter products 30 displayed by the system 10.

The query 400 is next compared to the various product categories 610, which have a field managed by the site administrator for specific keywords that should trigger, adding this category as a filter. The analyzed query 400 is checked against the database of categories, comparing the field for trigger words with the individual words in the analyzed input, as well as pairs of words. Example, the input "A B C D" would check against the single terms "A", "B", "C" and "D", as well as in pairs "A B", "B C" and "C D". If a matching category is found, the terms that triggered the match are removed from the analyzed input, and a filter for that category is added to the overall search query and treated as is the visitor has manually checked that category filter. Internally, "category", "industry", "event", "holiday", and "cause" filters all work the same, and are powered by this same database, so this one auto-filter covers all of them at once.

The analyzed query 400 is then checked against the database of brand names, comparing the brand title with the individual words in the analyzed input, as well as pairs of words. Example, the input "A B C D" would check against the single terms "A", "B", "C" and "D", as well as in pairs "A B", "B C" and "C D". If a matching brand is found, the terms that triggered the match are removed from the analyzed input, and a filter for that brand is added to the overall search query. It is treated as is the visitor has manually checked that brand filter.

The analyzed query 400 is additionally checked against a list of color options. If any of the following is found in the analyzed input: Black, Blue, Brown, Camouflage, Clear, Frosted, Glow in the Dark, Gold, Gray, Green, Orange, Pink, Purple, Rainbow, Red, Silver, Tan, White, Yellow; it is then treated as if that color was selected as a filter and the term is removed from the analyzed input (except for "orange" to account for the fruit).

Still yet other analysis may be performed by the system 10 to ensure the most relevant facets 321 are captured and displayed to the user. The query 400 is checked against pattern for ounce notation, that being a number followed by "oz", "oz.", or "ounces". If an ounce notation is found in the analyzed input it is then treated as if that value was selected as a filter and the term is removed from the analyzed input. Other facets 321 may include product sales and embroidery options.

Once these calculated auto filters have been determined, the query 400 is then run against the index 200 using the analyzed input and the filters determined by the logic above. The original input is also included in a separate field to be run against the search engines spellchecker. If no records 501 are returned, and there is no spelling suggestion, then all of the "auto-filters" are removed and the analyzed input goes back to what it was before the terms for the auto filters were removed. Then it proceeds with the main search. If there is a spelling suggestion for the original query with 70% or greater confidence from the search engine and there are no records 501 returned by the search query, then the "spell corrected" term gets used in its place. Then it proceeds with the main search. This is for the purpose of auto correcting any typos or misspellings in the search input. Any suggestion with less than 70% confidence is ignored (There is a second spellcheck later on with a lower threshold that offers a suggestion, but does not auto-correct). If the query returns a single product result 501, then the search automatically redirects that matched product 30.

Finally, the analyzed query 400 is compared with the returned products 30 for a match in the material field. If a material name is matched in more than 30% of the products 30, it is "auto-filtered" like the previous ones. This includes adding a new filter for that field, and removing the matched value from the analyzed input. This is done as a last step after the test query, because often materials that are named in the product description or title that would garner a match do not always appear as the value for the material field entered for the product 30. For example, a visitor may enter a search containing "metal", which would match many products 30 based on its description, but may have a value of "brass" or "stainless steel" or "aluminum" and so would fall off the results because it failed to meet the filter of a material of metal. Additionally, there is one last check against the entered term for keywords that trigger a default sort other than by best match. Those keywords being things like "cheap", "wholesale", etc.

Once the query in analyzed 400, it is then built by the system 10 with weight on certain factors before going to the search engine. The formula for the relevancy of a matched item is: all scores are set to be boosted by a range from 1 to 10 based on product views. This works by taking all items in the index, and each product 30 is scored based on how many views they have relative each other. An example of this is: if there are three products 30 with view counts of 10, 505, and 1000, the product 30 with 10 would get a boost of 1 (because it is the lowest), the product with 505 would get a boost of 5 (because it is in the middle of the lowest value and the highest value), the products 30 with 1000 would get a 10 (because it is the highest value). This boost value goes to 7 decimal places, so a real world boost might be 1.0048324 for a product 30 on the low end of the view count, and 8.681485 for a product 30 on the high end.

The index 200 contains products, regular site content, and blog posts that are being searched across. Product records get a boost factor of 10, and if it's a match in the product title, it gets a boost factor of 100. Regular content pages get a boost factor of 50, blog content gets none. Content pages receive a high initial boost to help push the results above products 30 when the search is for a specific content page. All of the remaining boosts apply only to product 30 records 501 which will have a higher cumulative boost when there is a better match on a product 30 than a content page. The relevance of a product 30 record is boosted by a factor of 100 if half or more of the search term is in the title. It is boosted by a factor of 50 if half or more of the search can be found in the product description. If the original criteria is found in the list of colors for a matched products 30 there is a boost added at a factor of 100. This catches cases where the auto filtering failed to yield results, but there is a color named in the search input. There are also boosts for the distance of the search value's words in the title and description. The relevance is boosted by a factor of 5 if the search words are within 3 words of each other in the search field (either title or description), then by 5 again if they are within 2 words, 5 again if they have only 1 word separation, and another 5 if the entire search value is found in its entirety in the search field. There is a boost factor of 10 applied to products 30 that have a minimum quantity less than 50, and a factor of 5 if the minimum quantity is between 50 and 100. With the boosts in place the query is run against the search engine including any auto-filters/sorts and the boost formula to return the most relevant results.

All of the facets 321 and the search queries 400 that triggered them are remembered by the system 10 for each search. If any of the facets 321, displayed as filters, are unchecked in the form, then whatever term that had triggered it is returned to the analyzed input and the search is run again. For example if someone searches for "blue Monday" it would be translated by the system 10 to a search for "Monday" in the color "blue". If the visitor didn't want the blue color applied and unchecks the filter, then the search reverts back to "blue Monday" with no filter. Any and all manipulation of the search term is invisible to the visitor who always sees their original term in the search bar regardless of what portion of it is being used as the query, and what was stripped out by an auto-filter. The analyzed version is remembered and re-used as further filtering is applied but is never actually shown to the visitor.

FIG. 10B is a system 10 screen displaying a portion of a results page 550 illustrating various filters 320. Shown in FIG. 10B, the system may display a set of filters 320 on a results page 550 based off the facets 321, which are common characteristics found in the search results.

Figure 10C:
FIG. 10C is a system screen displaying a search result with a ribbon.

FIG. 10C is a system 10 screen displaying a search result 501 with a ribbon 565. As shown in FIG. 10C, a ribbon 565 may be displayed on an individual search result 501 to draw attention to priority items (e.g., items on sale, made in the USA, etc.). Each product 30 has a certain set of facets 321 that get promoted in the form of a ribbon laid over the product image when shown as when the product 30 is displayed as a search result 501. There is a priority set on the ribbons 565 so that products 30 who may have multiple promoted facets 321 will be given priority. Many of the facets 321 that display as a ribbon 565 are also available as filters 320. There are rules in the ribbon 565 display to not show redundant ribbons 565. An example being, if "Free Setup" is a checked filter 320, then even though "Free Setup" is a high priority ribbon 565, it will be passed over for a lower priority ribbon 565 because due to the filter 320, all products 30 show are already "Free Setup". Rather than filling the list with all this same ribbon 565, the next available facet 321 in the priority list is displayed, allowing for more variety similar to the declumping method 310 discussed in FIGS. 8A-8F.

Figure 11A:
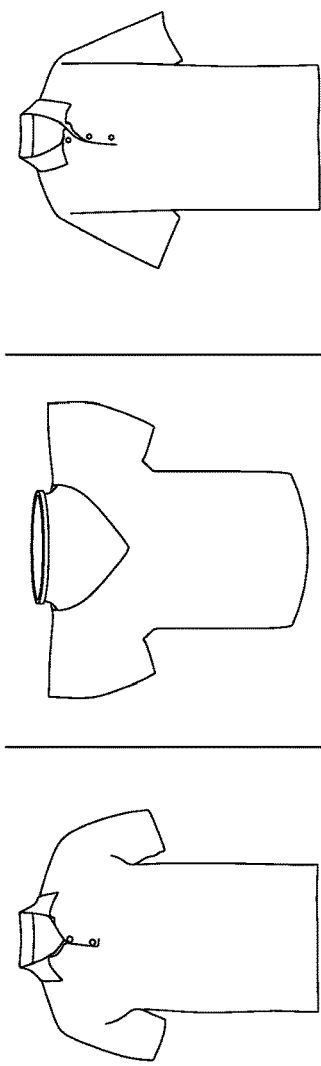
FIG. 11A is a system screen displaying a delivery filter.

FIG. 11A is a system 10 screen displaying a delivery filter 320. As shown in FIG. 11A, the delivery filter 320 functions off the date a product 30 could be received by the user. Calendar days are used instead of business days because of the inconsistency of when certain vendors have holidays or shut downs. What the site might count as a business day may not be one for the vendor, but no one disputes calendar days. On the filter 320 sidebar there is a date-picker form element allowing the visitor to enter a deadline by which they need a product 30, as well as a box for their zip code. When a date is entered, the system 10 counts the number of days until that date, and the search query is adjusted to only pull in products 30 that can make that delivery date. If that initial search returns no products 30 that can meet a certain deadline, then the exact same query is rerun but adding a single day to the deadline. The day to day cutoff for when one day ends and the next begins are determined off pre-defined times in the system. This process repeats 7 times, going up to a week past their original deadline to present products 30 that can make it as close to that deadline as possible. If products 30 are found via the deadline retry, the results may have an added note displayed by the system 10 letting the user know the closest date to the deadline available.

The system 10 then examines the index 200 for the matched products 30 and pulls out which service levels plus shipping options are able to meet the deadline. It then takes these rows from the pricing index, and combed with the possible shipping options, indexed in the transit index for that vendor zip to customer zip combo, returns a set of records 501 for the possibilities. This information is used to match each product 30 up with the cheapest delivery option (lowest service level plus slowest shipping speed) that will have a product 30 arrive in time to meet the entered delivery deadline. First, the product service options are evaluated to see which one was the cheapest that could meet the deadline if shipped overnight. Once that was identified 2 day, 3 day and ground were evaluated to see if there was a cheaper option for shipping to meet the deadline at the cheapest product service level. To increase in the delivery date accuracy, the time 30 which the product 30 needs to be placed by is also calculated using the vendors cut off time, and an estimate of how much time required for QLP to process the order. This cut off time is stored along with the count of calendar days until shipment of the product 30 for both an order placed same day before the cut off, and after the cut off time. The storage of the data in this fashion allows for quick and easy searches for products that can meet certain deadline criteria.

Figure 11B:
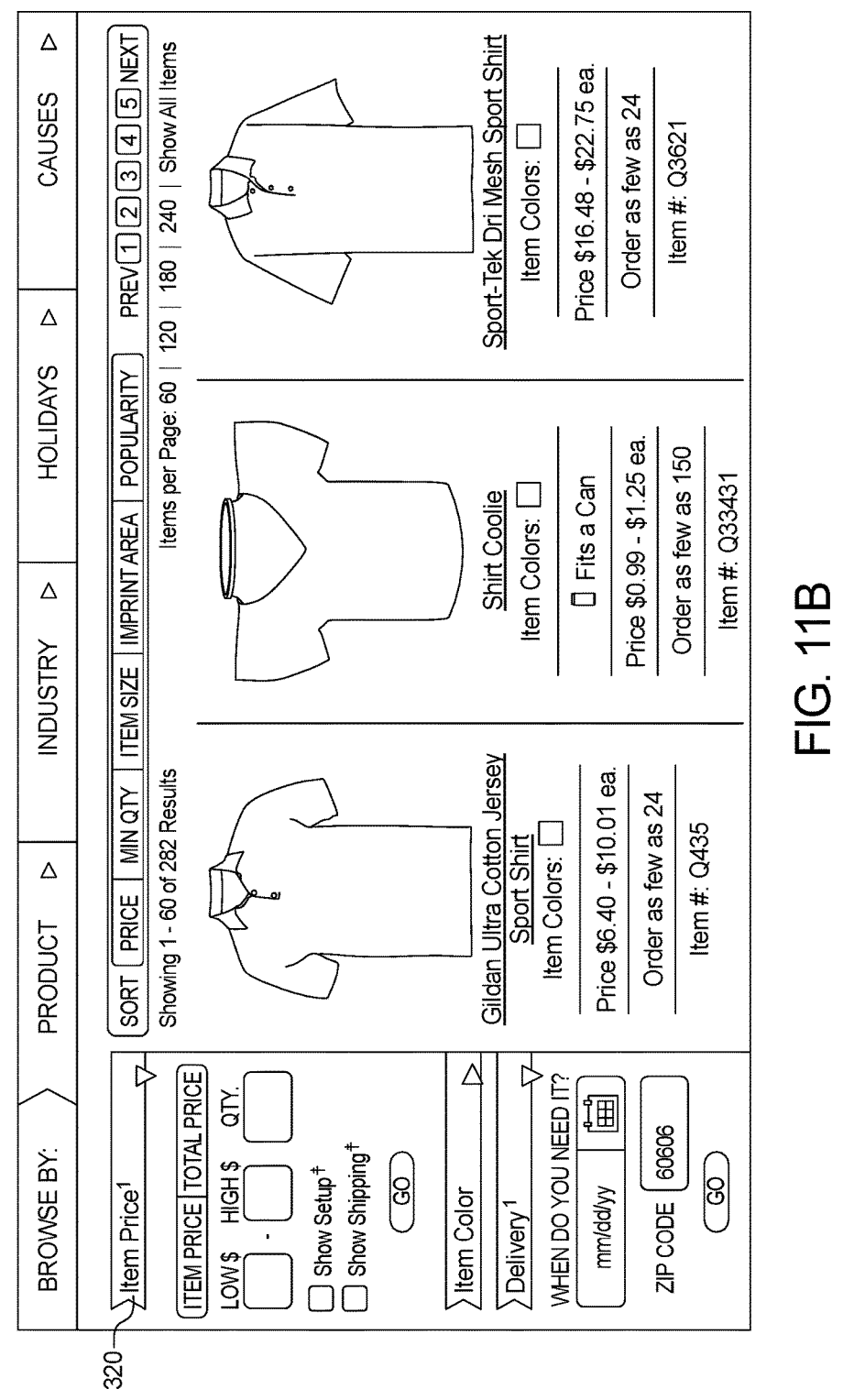

FIG. 11B is a system 10 screen displaying a price filter 320. This filter 320 consists of three fields: Price High, Price Low, and Quantity. If a high price value is entered, then all products 30 whose lowest price is less than that high are returned; if a low price value is entered then all products 30 whose lowest price is more than that low are returned; if both high and low price values are entered, then all products 30 whose lowest price is between the low and the high are returned. If a quantity value is entered alone, then all products 30 that are able to be produced in that quantity are returned. This is helpful for filtering out any products 30 that require a high minimum quantity when looking for a small quantity of products 30.

When the quantity field is used with either of the price fields, then the query generated for the search engine uses the pricing index. The query gets the prices for the "standard" service at the quantity specified and uses that price to compare against the prices entered to filter out product records 501. One exception to this is if the quantity entered is one "1", then a matching price is allowed from either the "standard" and "blank" service levels (blank un-imprinted products can often be ordered in singles). Having a value in the quantity box changes the pricing display below each product 30 to show the pricing at that quantity.

Also shown in FIG. 11B, there is an option toggle on the pricing filter 320 to change the filter 320 from searching by item price to total price. This changes the price boxes to apply to a total price instead of item price. The total price is simply the item price multiplied by the quantity. For a $1 product at the quantity of 50, the total price is $50. This becomes useful for someone searching on a budget, and wants to see for example if they can find an item spending between $300 and $400 for 150 pieces. There is no difference between doing a search for an item price between $1 and $2 at 150 pieces, and doing a search for a total price between $150 and $300 at 150 pieces.

Price searches without a quantity operate on the lowest quantity bracket that a product 30 is available at, often referred to the minimum quantity. This will take the price at the minimum quantity and multiply it by that quantity, and use that as the "total price" for the product 30. When the quantity field is used with either of the price fields, then the query generated for the search engine uses the pricing index. The query gets the prices for the "standard" service at the quantity specified and uses that price times the entered quantity to compare against the prices.

Figure 11C:
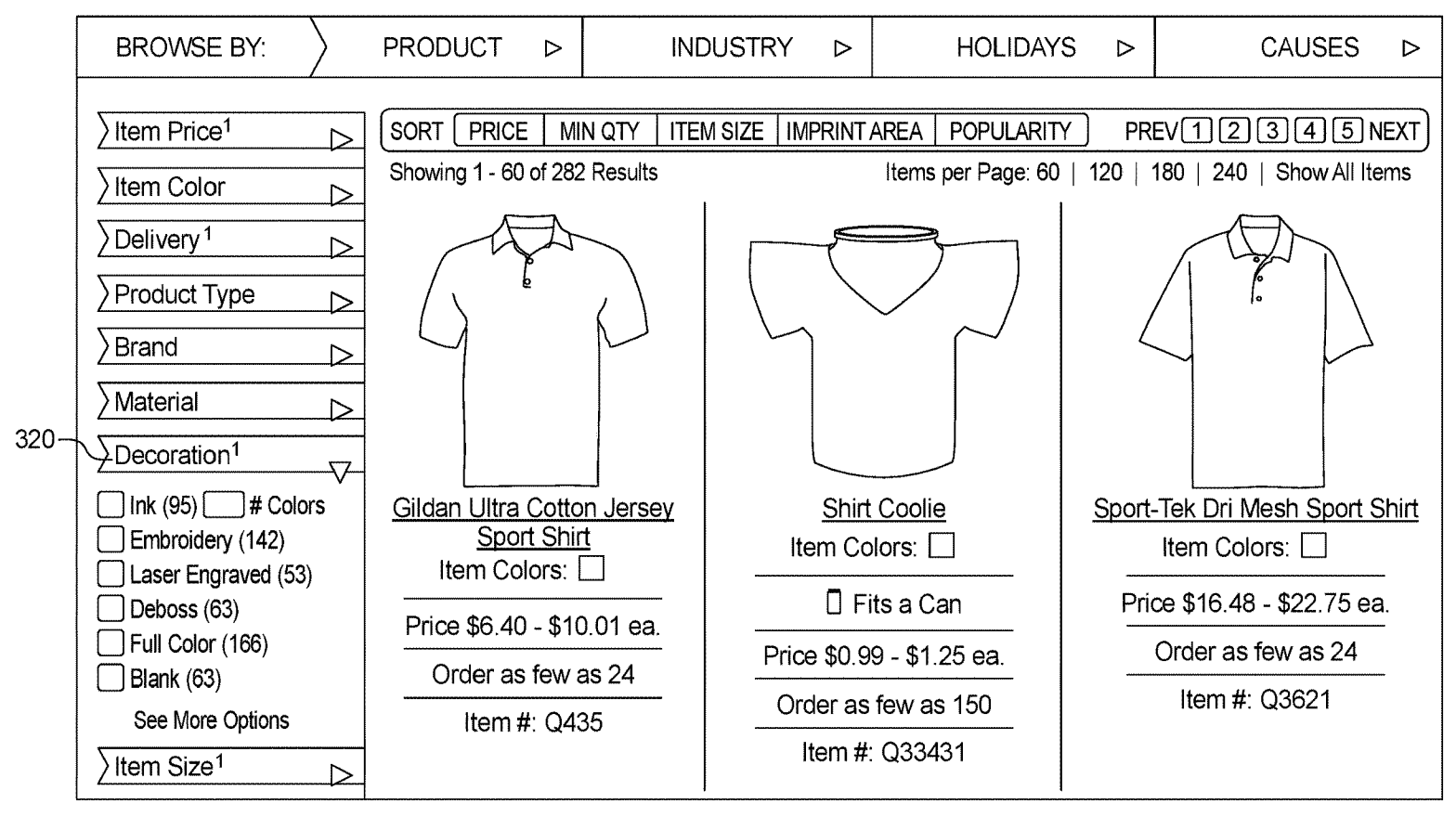

FIG. 11C is a system 10 screen displaying a decoration filter 320. The decoration filter 320 allows users to not only filter by the type of decoration they would like for their product 30, but when choosing ink, there is also the option of entering the number of imprint colors desired. Every product 30 has limitations on decoration options including how many colors are able to be used in an imprint. The "number of colors" filter allows for showing only products 30 which have an imprint method capable of printing the number of colors entered. This allows for users who have 3 color logos to quickly filter out any products that can't be imprinted in at least 3 colors.

The decoration filter 320 also interacts with the decoration area filter 320 which is used to select the shape of the imprint area. This ensures no products 30 are shown with mutually exclusive decoration filters configured. As an example, if "ink" is selected as the decoration method, and "square" is selected as the decoration shape; the filters 320 will not pull products 30 which can be either ink imprinted or have a square imprint, but will only pull products 30 that can have both an ink imprint and square option. This prevents issues where products 30 that can be imprinted multiple ways and with multiple shapes show up as false positives.

As mentioned above, the system 10 filters 320 can work together to avoid false positive search results. Besides the decoration and decoration area filters 320 working together, other such instances of cross filter support may include: if the delivery filter 320 is in use, the pricing filter 320 is no longer limited to just the standard service. It will also search the other service levels ensuring the products 30 returned fit both criteria, making the deadline for delivery, and the service level required fits in the entered budget.

Other cross-filter 320 interactions may include the imprint and delivery filters 320. This interaction is best explained as: each product 30 has a certain number of imprint colors that come included with their price. Typically this number is also the maximum number of imprint colors that can be used in rush production. If a number of imprint colors is entered into the decoration filter, this is accounted for in the delivery filter, and no products 30 will have their rush service times considered if they can't support the number of imprint colors entered in the decoration filter.

Another cross-filter 320 interaction deals with the closeout and color filters 320. This interaction is explained as: products 30 go on closeouts in two ways. Either the whole product 30 is discontinued and the remaining stock is a closeout, or just certain colors are discontinued and on closeout. If closeouts is checked as a filter, then the products 30 only show those who are either on closeout, or have certain colors that are on closeout, and the color filter is switched to show counts and do filtering for only the colors that are on closeout.

Additionally, all of the filters are cumulative; meaning a product 30 must match all of the specified conditions to be returned in the search results. There is one exception to this in the on sale and on closeout filters. Very rarely will a product 30 be on sale and on closeout, so when both these options are selected it is treated like an "or" instead of "and", they return all products 30 that are on sale or on closeout and match any other condition applied by the rest of the filters 320. The filters 320 can also utilize price estimates for setup costs, shipping costs, and the total price to help users determine the best value for their order.

FIG. 12A is a system 10 screen displaying product categories 610 which may be searched. As shown in FIG. 12A, the system 10 may search the product index 200 based off product categories 610 instead of performing a keyword search as discussed in FIGS. 1-11. When performing such a search, the user may click the "browse by" user interface 600 which will display product categories 610 which may or may not be equivalent to product types 31 discussed previously in this application. When a user clicks on one of the product categories 610 displayed (in this example "Lanyards"), the system 10 will query the product index 200 or products database 300 for all products 30 which call within the product category 610. The system 10 may then introduce variety into the products 30 displayed by the system for the product category 610 selected via the declumping method 310 discussed in FIGS. 8A-8F of this application. The declumping method 310 may be modified as needed by the system 10 to apply this method 310 to a product category search instead of a keyword search.

Figure 12B:
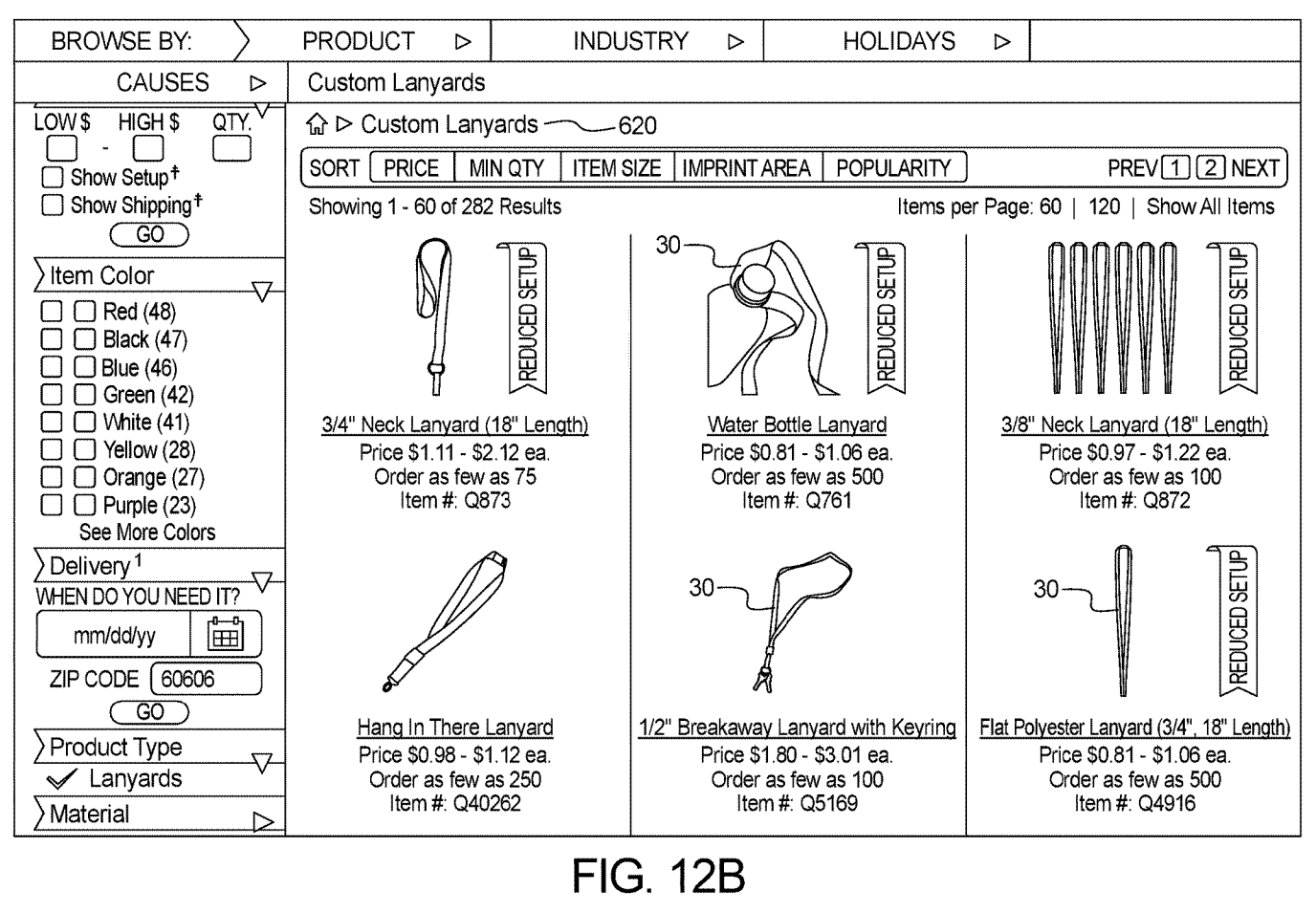

FIG. 12B is a system 10 screen displaying product categories 610 search result page 620. As shown in FIG. 12B, the product categories search result page 620 may display products 30 which call within the product category 610 (in this case "Lanyards") searched for by the user via the product category search user interface 600. Further shown in FIG. 12B, the declumping method 310 may be applied to the search results within a product category 610 search to display multiple variations of a product 30 within a given product category 610.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A computerized method for providing search results to a user on a user interface, comprising:
    generating a ranked order of results based on at least one search criteria;
    re-ordering the ranked order of results to populate one or more results pages, wherein each results page of the results pages includes two or more rows and two or more columns, wherein each row and each column includes two or more slots for displaying a result, wherein, each row, column, page, and each combination of rows and columns define a visual cluster, wherein the re-ordering is accomplished by performing the sub-steps of;
    initializing a counter at zero for one or more of the visual clusters, wherein the counter has an associated property type, wherein the counter is a record of the number of results matching the associated property type previously populated in the visual cluster, wherein each counter has a corresponding counter limit, for each slot, iterating through the ranked order of results to find an unpopulated matching result that has no properties matching a property type corresponding to any counter that is at its counter limit, populating the matching result in the slot, and incrementing ever counter whose corresponding property type matches the matching result;
    displaying the one or more results pages on the user interface;
    wherein at least one of the counters are then reset to zero once at least one counter's limit has been exceeded and no search results remaining in the ranked order have a property type matching a result which corresponds to a counter not at its limit; and
    then displaying the one or more results pages on the user interface.

2. The method of claim 1, wherein the one or more visual clusters includes each row, each column, and each page.

3. The method of claim 1, wherein a search criterion includes keywords.

4. The method of claim 1, wherein a search criterion includes metadata.

5. The method of claim 1, wherein a property type relates to a physical characteristic of a non-stock good.

6. The method of claim 5, wherein a physical characteristic of a non-stock good includes the geometric shape of the non-stock good.

7. The method of claim 5, wherein a physical characteristic of a non-stock good includes the weight of the non-stock good.

8. The method of claim 5, wherein a physical characteristic of a non-stock good includes the color of the non-stock good.

9. The method of claim 1, wherein a property type relates to a product type of non-stock good.

10. The method of claim 9, wherein a product type of a non-stock good is a type of garment.

11. The method of claim 9, wherein a product type of a non-stock good is a type of container.

12. The method of claim 9, wherein a product type of a non-stock good is a type of marketing novelty.

13. The method of claim 1, wherein the user interface is displayed within a web browser.

14. The method of claim 1, wherein the user interface is displayed on a mobile device.

15. The method of claim 1, wherein the ranked order is ranked in terms of the number of sales of non-stock goods.

16. The method of claim 1, wherein the ranked order is ranked in terms of views of non-stock goods on the user interface.

17. The method of claim 1, wherein the slot is a visual area on the search page including positioning information.

\* \* \* \* \*